(12) United States Patent
Shinohara

(10) Patent No.: US 10,864,863 B2
(45) Date of Patent: Dec. 15, 2020

(54) RESIN-MOLDED COMPONENT

(71) Applicant: MORIROKU TECHNOLOGY COMPANY, LTD., Tokyo (JP)

(72) Inventor: Kenta Shinohara, Tokyo (JP)

(73) Assignee: MORIROKU TECHNOLOGY COMPANY, LTD., Tokyo (JP)

( * ) Notice: Subject to any disclaimer, the term of this patent is extended or adjusted under 35 U.S.C. 154(b) by 102 days.

(21) Appl. No.: 16/408,821

(22) Filed: May 10, 2019

(65) Prior Publication Data

US 2019/0366946 A1 Dec. 5, 2019

(30) Foreign Application Priority Data

May 30, 2018 (JP) ................................. 2018-103839

(51) Int. Cl.
*B60R 13/04* (2006.01)
*B62D 25/12* (2006.01)
*F16B 2/22* (2006.01)

(52) U.S. Cl.
CPC .............. *B60R 13/04* (2013.01); *B62D 25/12* (2013.01); *F16B 2/22* (2013.01)

(58) Field of Classification Search
CPC ..... B60R 13/04; B60R 13/0206; B62D 25/12; F16B 2/22; F16B 5/065; Y10T 24/30
USPC ............... 296/1.08, 146.7; 24/289; 52/716.5, 52/716.6, 716.7
See application file for complete search history.

(56) References Cited

U.S. PATENT DOCUMENTS

| | | | | |
|---|---|---|---|---|
| 7,165,371 B2* | 1/2007 | Yoyasu | ................... | B60R 13/04 24/292 |
| 8,656,563 B2* | 2/2014 | Hiramatsu | ............ | F16B 37/043 24/297 |
| 8,979,156 B2* | 3/2015 | Mally | ................... | F16B 5/0657 296/1.08 |
| 9,216,703 B2* | 12/2015 | Lauxen | ................. | F16B 5/0657 |
| 2015/0113773 A1* | 4/2015 | Iwahara | .............. | B60R 13/0206 24/594.11 |
| 2019/0111858 A1* | 4/2019 | Xiong | ................... | F16B 21/086 |
| 2019/0390698 A1* | 12/2019 | Lepper | ................. | F16B 19/004 |

FOREIGN PATENT DOCUMENTS

| | | |
|---|---|---|
| JP | 11-319651 | 11/1999 |
| JP | 2003-063321 | 3/2003 |

OTHER PUBLICATIONS

English translation of Japanese Office Action dated Jun. 2, 2020, 5 pages.

* cited by examiner

*Primary Examiner* — Joseph D. Pape
(74) *Attorney, Agent, or Firm* — Rankin, Hill & Clark LLP

(57) ABSTRACT

A resin-molded component includes a mounting member which protrudes from a back surface of a main body and to which an attachment component is attached. The mounting member includes two side walls upstanding from the back surface and facing with each other, a connect part that connects respective tips of these side walls, and a mounting seat-surface which covers these side walls and the connect part and to which an attachment component is fastened. A hollow space is formed between the step, second side-wall part, connect part and the main body.

6 Claims, 14 Drawing Sheets

FIG.4
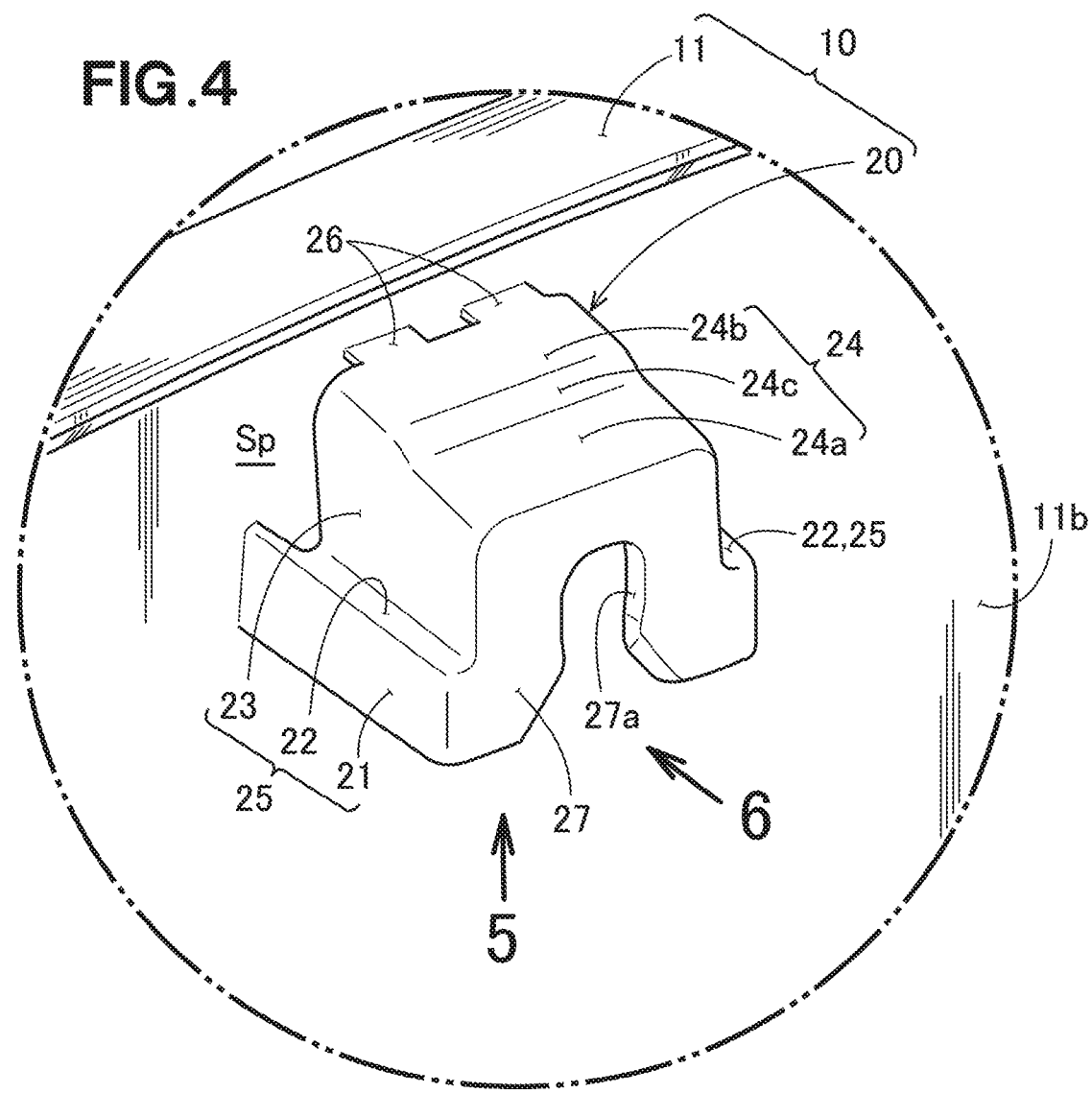
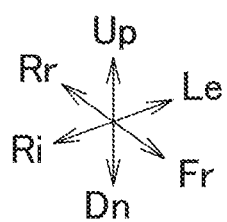

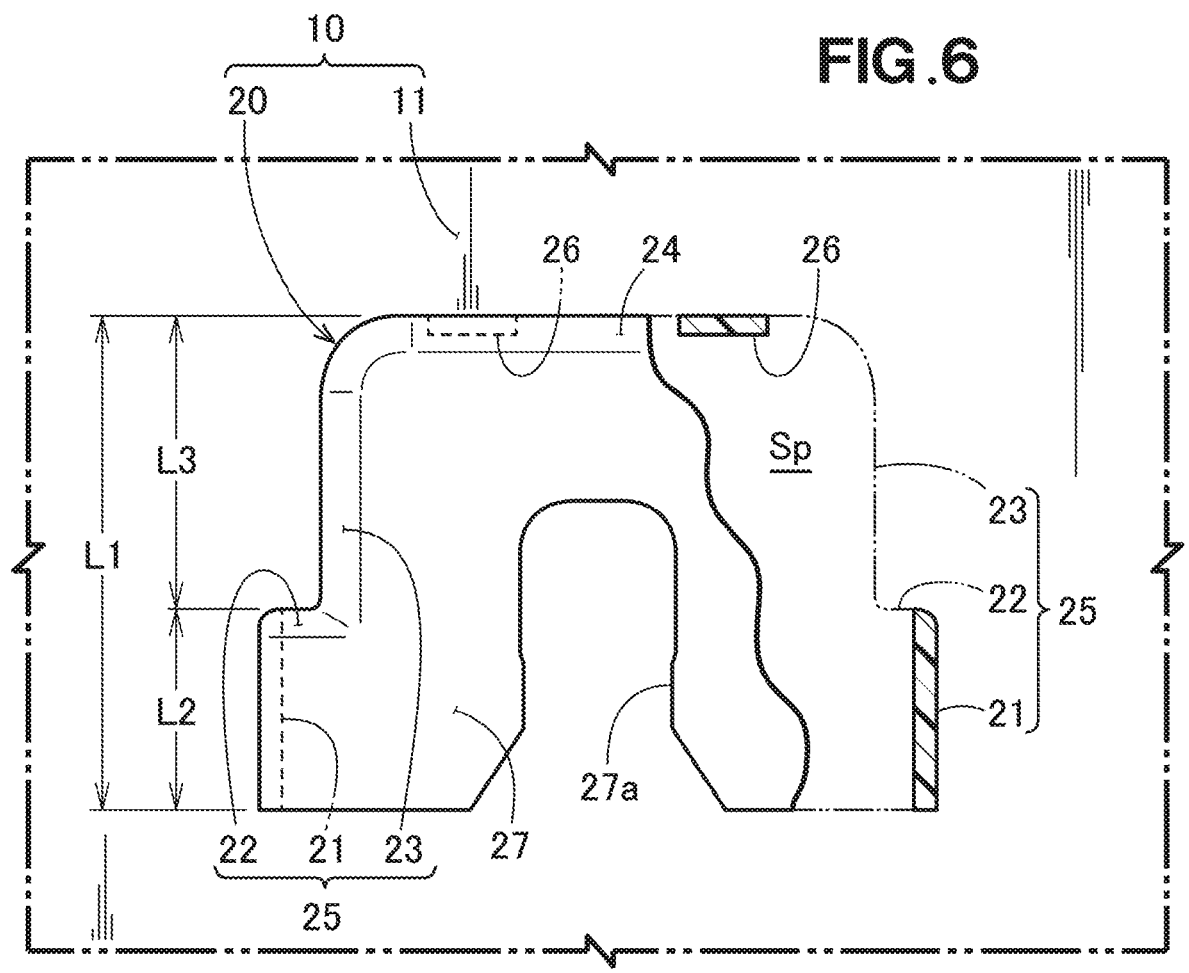
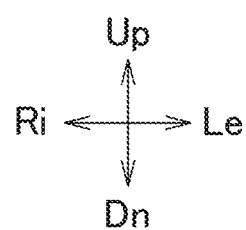
FIG.6

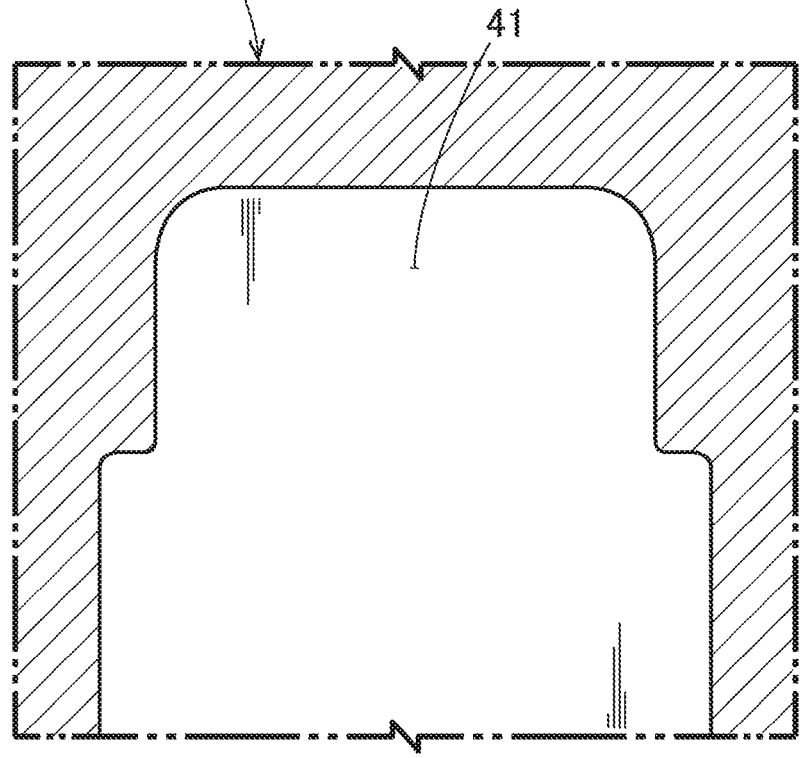

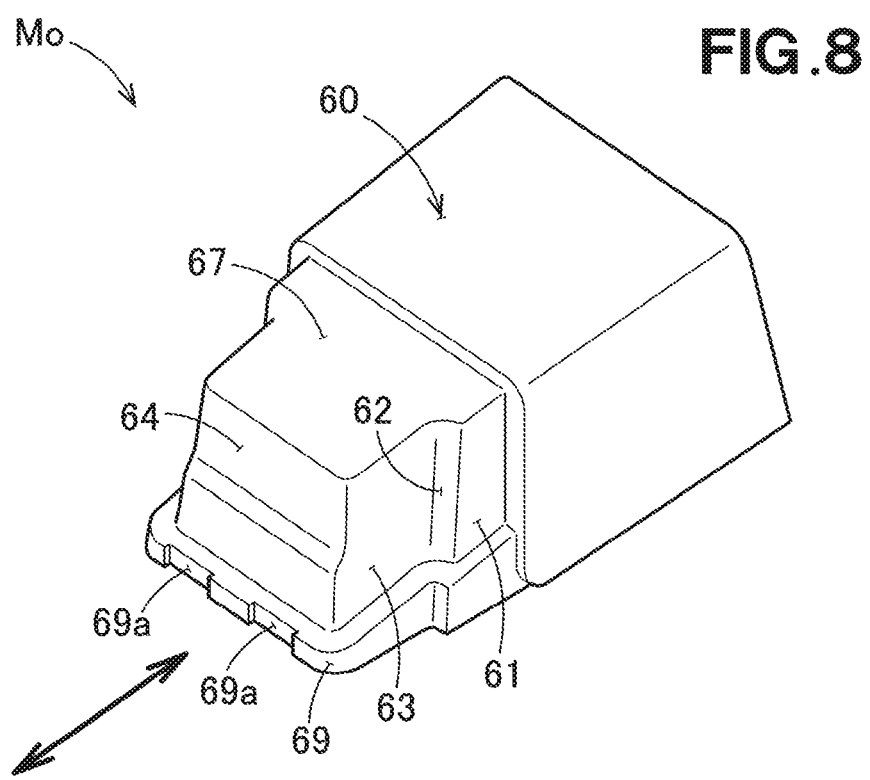

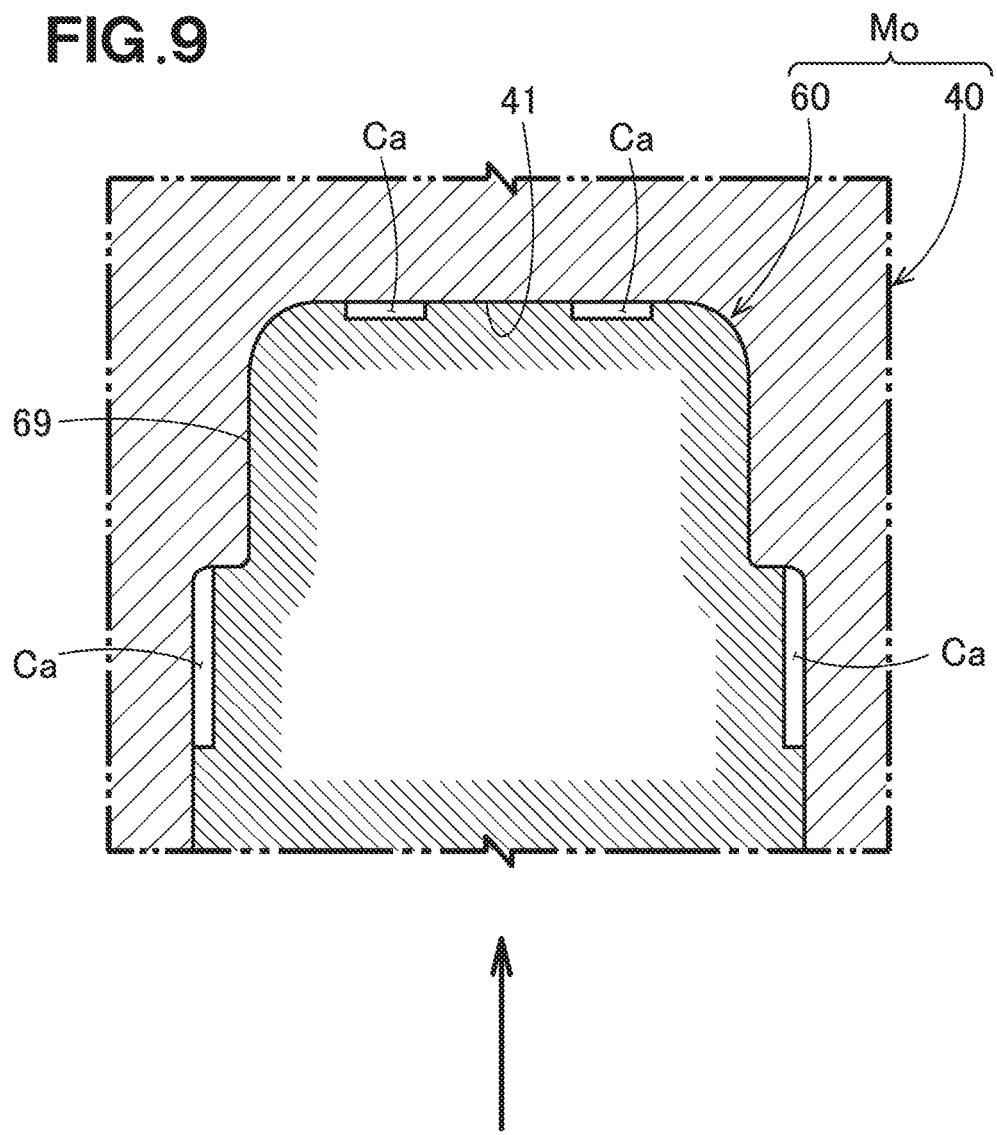

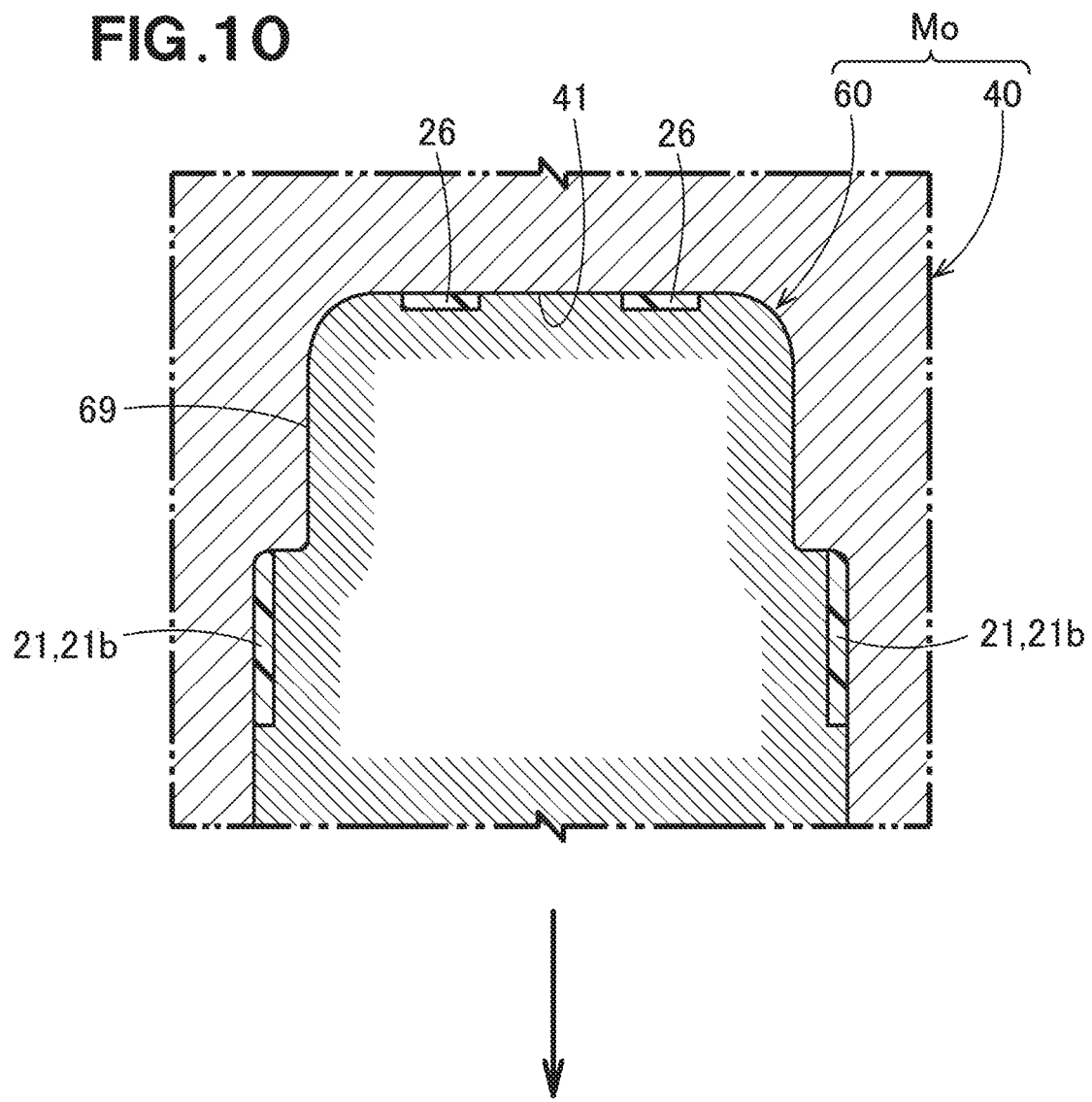

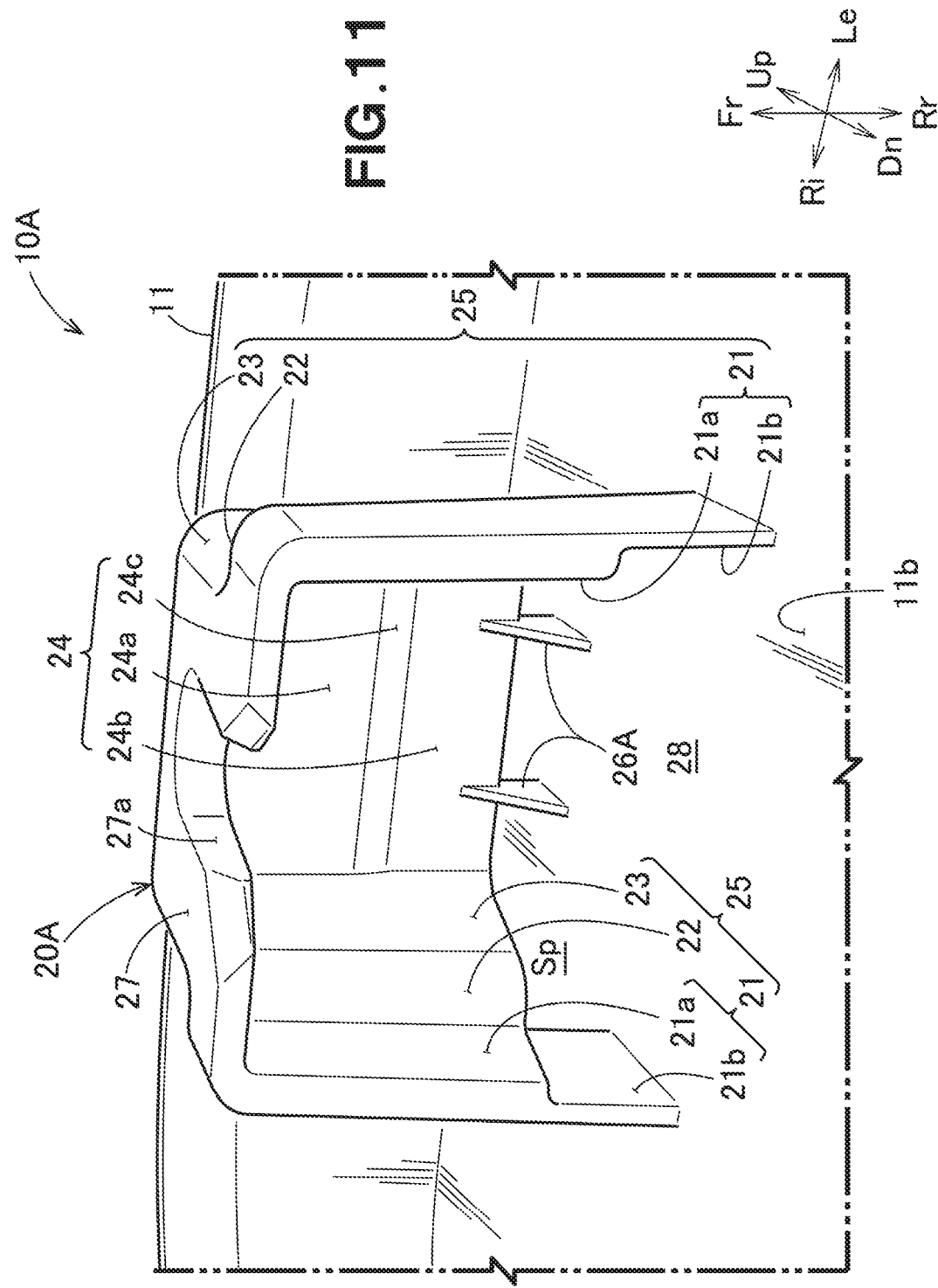

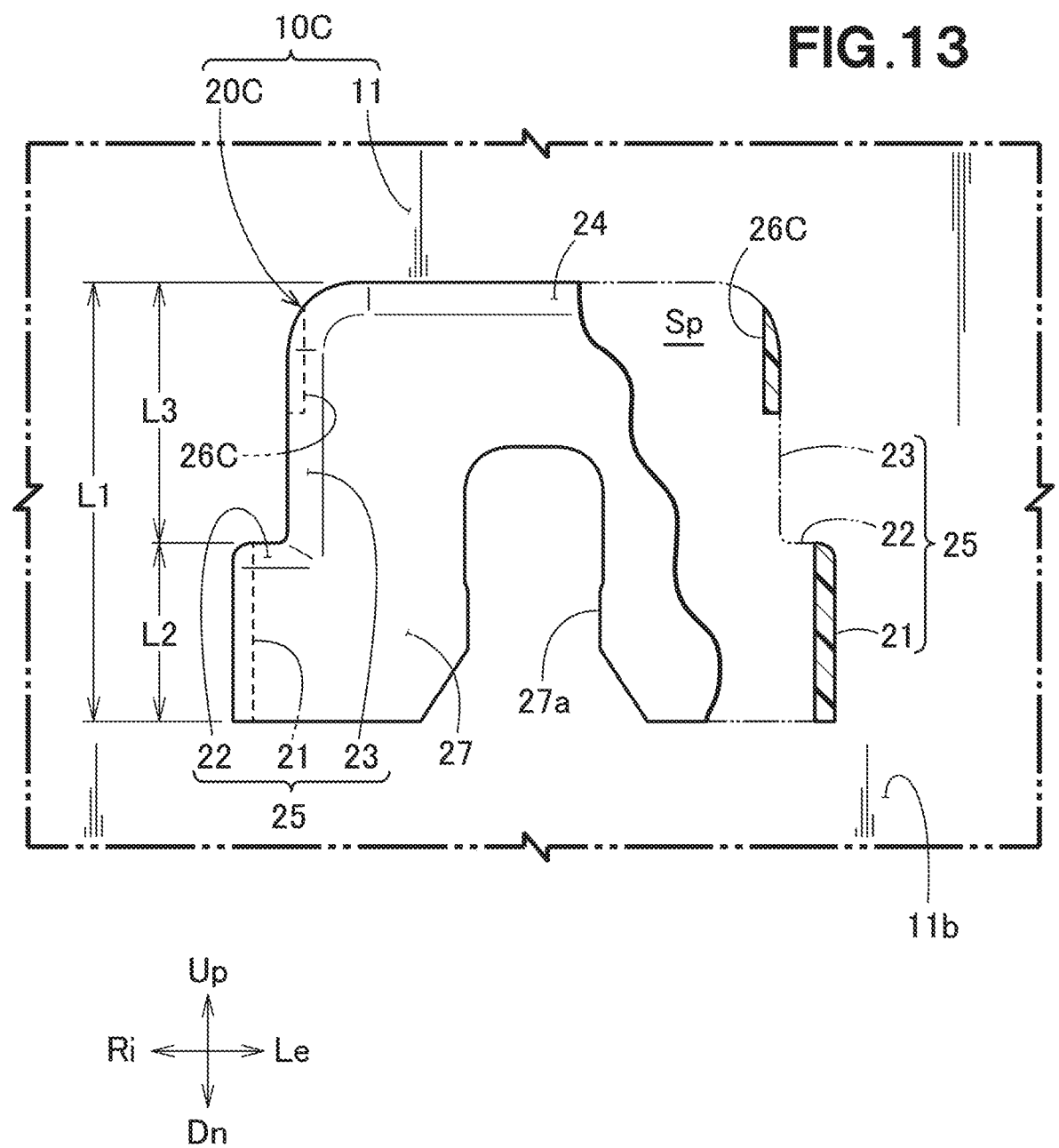

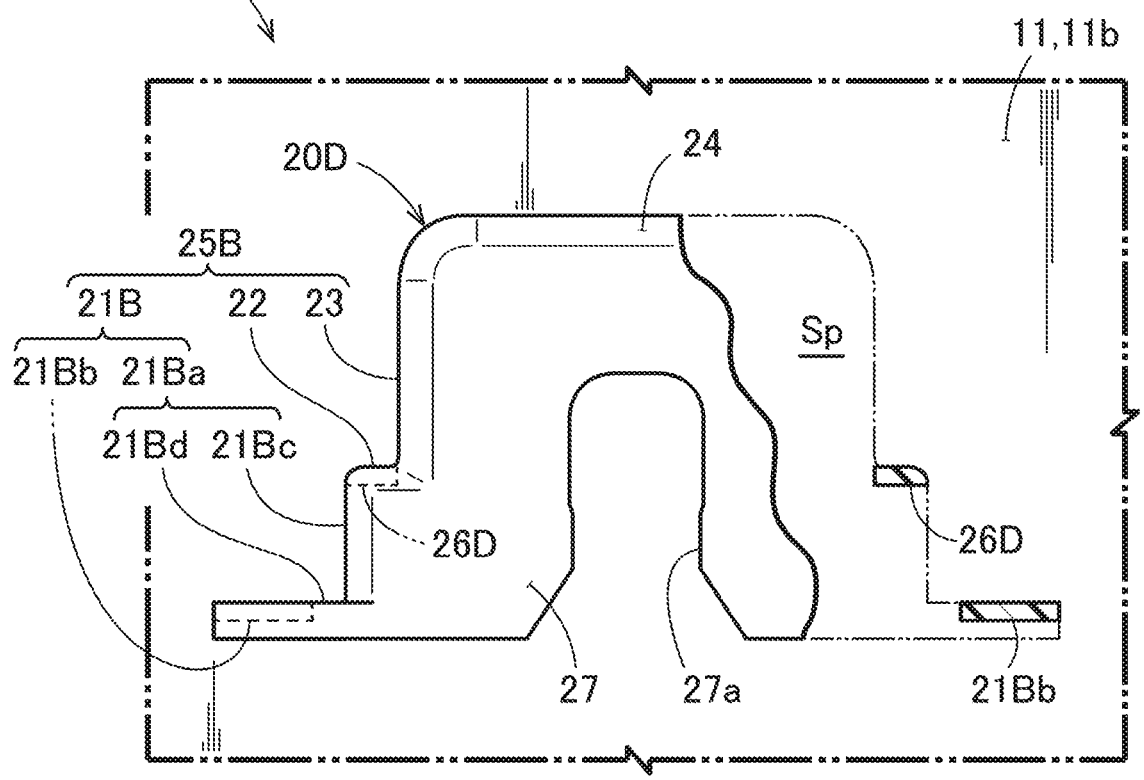
FIG.14
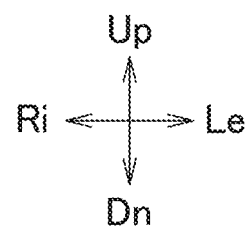

RESIN-MOLDED COMPONENT

FIELD OF THE INVENTION

The present disclosure relates to a manufacturing technology of a resin-molded component that has a design surface which is visible from the exterior.

BACKGROUND

Resin-molded components are applied as, for example, exterior components of a vehicle. The resin-molded component is a design component that is manufactured by resin molding like injection molding, etc. When a portion that includes a design surface is utilized as a main body, a mounting member to which an attachment component is attached is formed on a back surface of the main body. The resin-molded component can be attached to a vehicle body by attaching the attachment component to the mounting member, and by fitting the mounting member to the vehicle body. JP 2003-063321 A discloses an example conventional technology relating to such a resin-molded component.

The resin-molded component disclosed in JP 2003-063321 A includes a mounting member which protrudes from the back surface of the main body, and to which the attachment component for an attachment to the vehicle body is attached. The main body and the mounting member are formed integrally with each other by injection molding. That is, the resin-molded component is manufactured by applying a melted resin in a die, and by cooling this resin.

The mounting member is formed in a box shape that has one surface opened. The mounting member in such a shape ensures a high attachment rigidity.

SUMMARY OF THE INVENTION

According to the resin-molded component disclosed in JP 2003-063321 A, a side wall of the mounting member formed in the box shape upstands from the main body. When the resin is cooled and shrinks at a boundary between the side wall and the main body, a phenomenon such that the design surface is concaved toward the tip of the side wall, i.e., a so-called sink mark may occur. Regardless of whether the component is the exterior component of a vehicle, when sink mark occurs in the design surface, the appearance of the resin-molded component decreases.

An objective of the present disclosure is to provide a resin-molded component that ensures a high quality appearance.

A present disclosure provides a resin-molded component that includes:

a main body that includes a design surface which is visible from an exterior; and a mounting member which protrudes from a back surface of the main body and to which an attachment component is attached, wherein the main body and the mounting member are formed integrally with each other, wherein the mounting member is formed in a box shape having one surface opened, and includes: two side walls facing with each other; a connect part that connects respective tips of the two side walls; a mounting seat-surface which covers the two side walls and the connect part and which is capable of fastening the attachment component; and an opened part surrounded by the two side walls and the attach seat-surface, wherein at least one of the two side walls includes: a first side-wall part upstanding from the back surface at a location adjacent to the opened part; a step that extends toward the opposing side wall from an end of the first side-wall part; and a second side-wall part that extends in a direction apart from the first side-wall part from a tip of the step, and a hollow space is formed between the connect part, step, second side-wall part and the main body.

According to the embodiments of the present disclosure, the first side-wall part upstands from the back surface of the main body, and the hollow space is formed between the step, second side-wall part, connect part and the main body. The first side-wall part adjacent to the opened part upstands from the back surface. This ensures the attachment rigidity of the portion adjacent to the opened part. Conversely, the hollow space is formed between the connect part, step, second side-wall part and the main body. By decreasing the portion where sink mark may occur, the resin-molded component can be provided which ensures a high quality appearance.

If the side wall is formed in a planar shape and only a portion near the opened part is formed continuously from the main body, in this case, when a slide-type die is slid from a portion that becomes the opened part, the die cannot be pulled out at the side wall. That is, an undercut portion is to be formed. In order to enable the slide-type die to be pulled out, a plurality of slide-type dies is necessary. According to the embodiment of the present disclosure, the step and the second side-wall part are provided. This enables the first side-wall part to continuously upstand from the back surface of the main body and also enables a formation of the hollow space by the single slide-type die in an arbitrary size between the connect parts, steps, second side-wall parts and the main body. Since the resin-molded component can be manufactured by a small number of slide-type dies, the manufacturing costs of the resin-molded component can be reduced.

BRIEF DESCRIPTION OF THE DRAWINGS

FIG. 4 is an enlarged view of a part 4 in FIG. 3;

FIG. 6 is a diagram as viewed along an arrow 6 in FIG. 4;

FIG. 7 is a diagram for describing a main die applied for manufacturing the resin-molded component illustrated in FIG. 1;

FIG. 8 is a diagram for describing a slide-type die provided so as to be slidable relative to the main die illustrated in FIG. 7;

FIG. 9 is a diagram for describing a cavity forming process;

FIG. 10 is a diagram for describing a resin applying process;

FIG. 11 is a perspective view of a mounting member of a resin-molded component according to a second embodiment;

FIG. 13 is a diagram for describing an mounting member of a resin-molded component according to a fourth embodiment; and FIG. 14 is a diagram for explaining a mounting member of a resin-molded component according to a fifth embodiment.

DETAILED DESCRIPTION OF THE EMBODIMENTS

Embodiments of the present disclosure will be described below with reference to the accompanying figures. Note that in the following description, terms right and left mean right and left sides with reference to a person in a vehicle to which a resin-molded component is attached, and terms front and rear mean front and rear sides with reference to the travelling direction of the vehicle. Moreover, Fr, Rr, Le, Ri, Up and Dn in the figures indicate the front, rear, left, right, upper and lower sides with reference to the person in the vehicle.

First Embodiment

Figure 1:
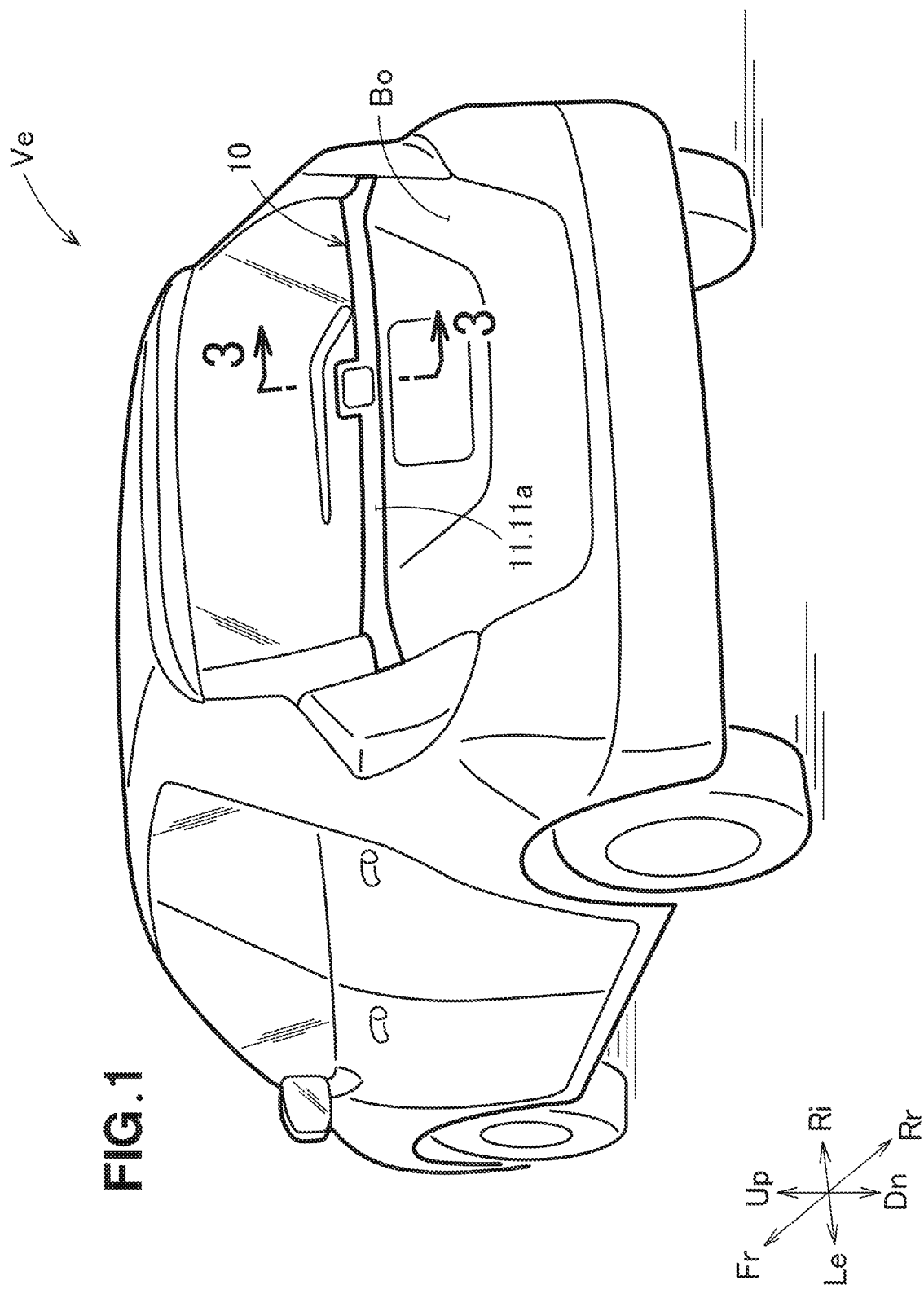
FIG. 1 is a perspective view of a vehicle to which a resin-molded component is attached according to a first embodiment.

With reference to FIG. 1, for example, a resin-molded component 10 is provided at a rear section of a vehicle Ve. The resin-molded component 10 is a design component which is formed of a resin and which is visible from the exterior of the vehicle Ve.

Figure 2:
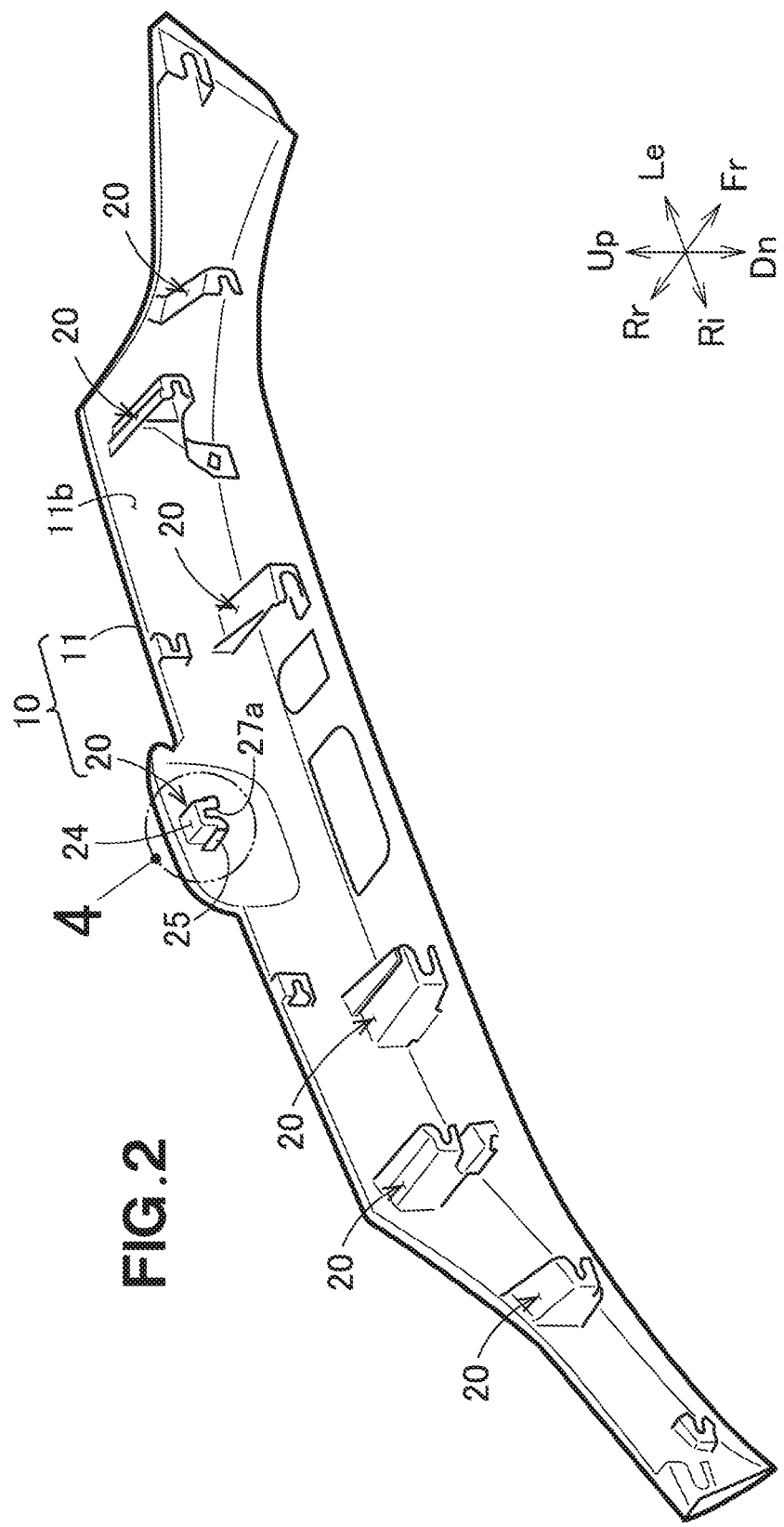
FIG. 2 is a perspective view of the resin-molded component illustrated in FIG. 1.
Figure 3:
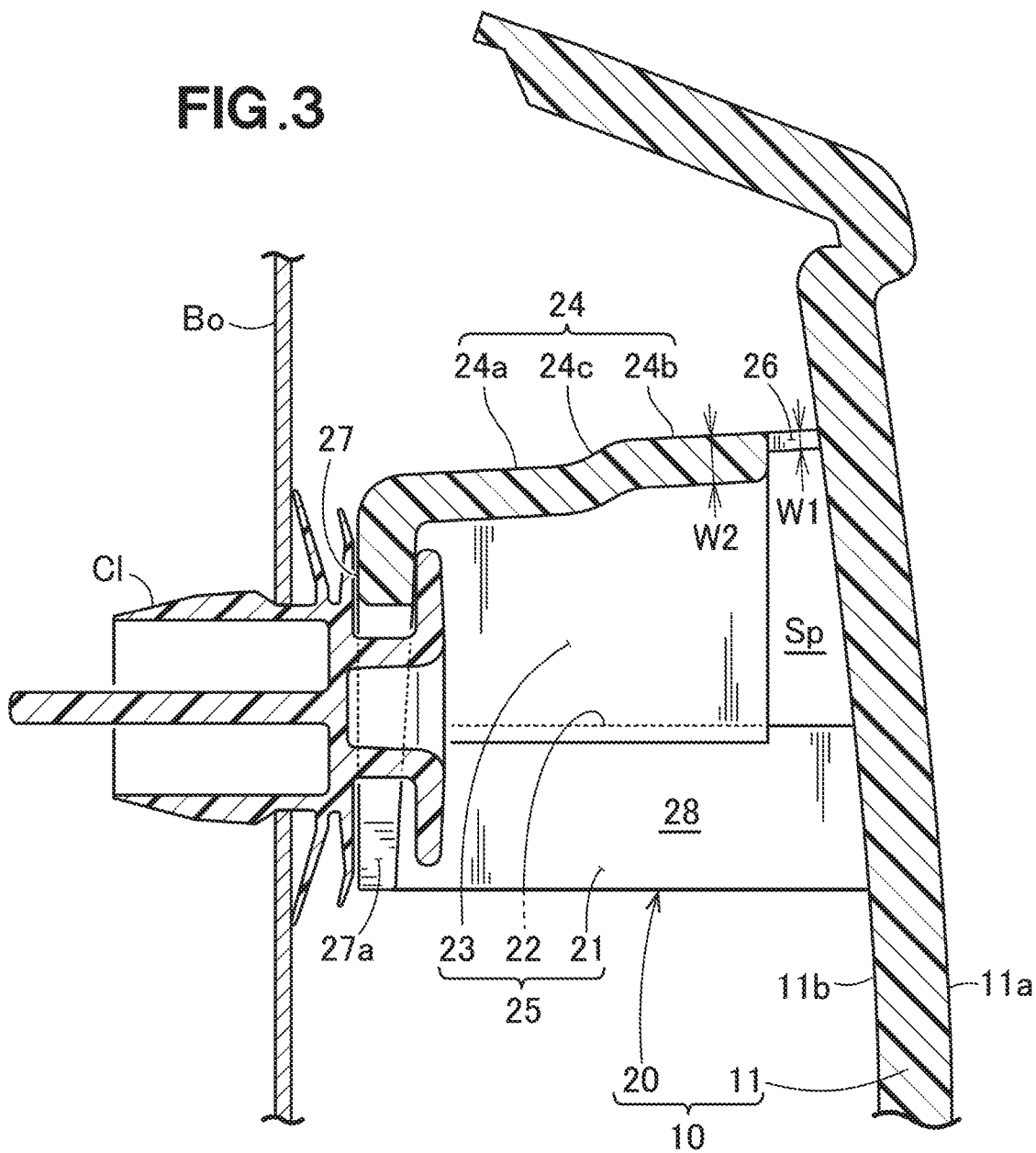
FIG. 3 is a cross-sectional view taken along a line 3-3 in FIG. 1.

With reference to FIGS. 2 and 3, FIG. 2 illustrates the resin-molded component 10 as viewed from the front side. Hence, the right and left sides are inverted relative to FIG. 1.

The resin-molded component 10 includes, all integrally formed one another, a main body 11 that has a design surface 11a which is visible from the exterior, and mounting members 20 each protruding from a back surface 11b of this main body 11. The plurality of mounting members 20 are formed on the back surface 11b. The term back surface 11b means a surface at the opposite side to the design surface 11a.

The mounting member 20 formed at the center will be described below in detail. Although the description for the other mounting members 20 will be omitted, the same structure as that of the mounting member 20 formed at the center is applicable. Note that the direction in which the respective mounting members 20 are opened can be selected as appropriate.

With reference to FIG. 3, the resin-molded component 10 is attached to a vehicle body Bo (mount-base member Bo) through respective clips Cl (attachment components Cl) attached to the mounting members 20. The mounting member 20 can be considered as a portion to which the clip Cl for an attachment to the vehicle body Bo is attached.

Figure 5:
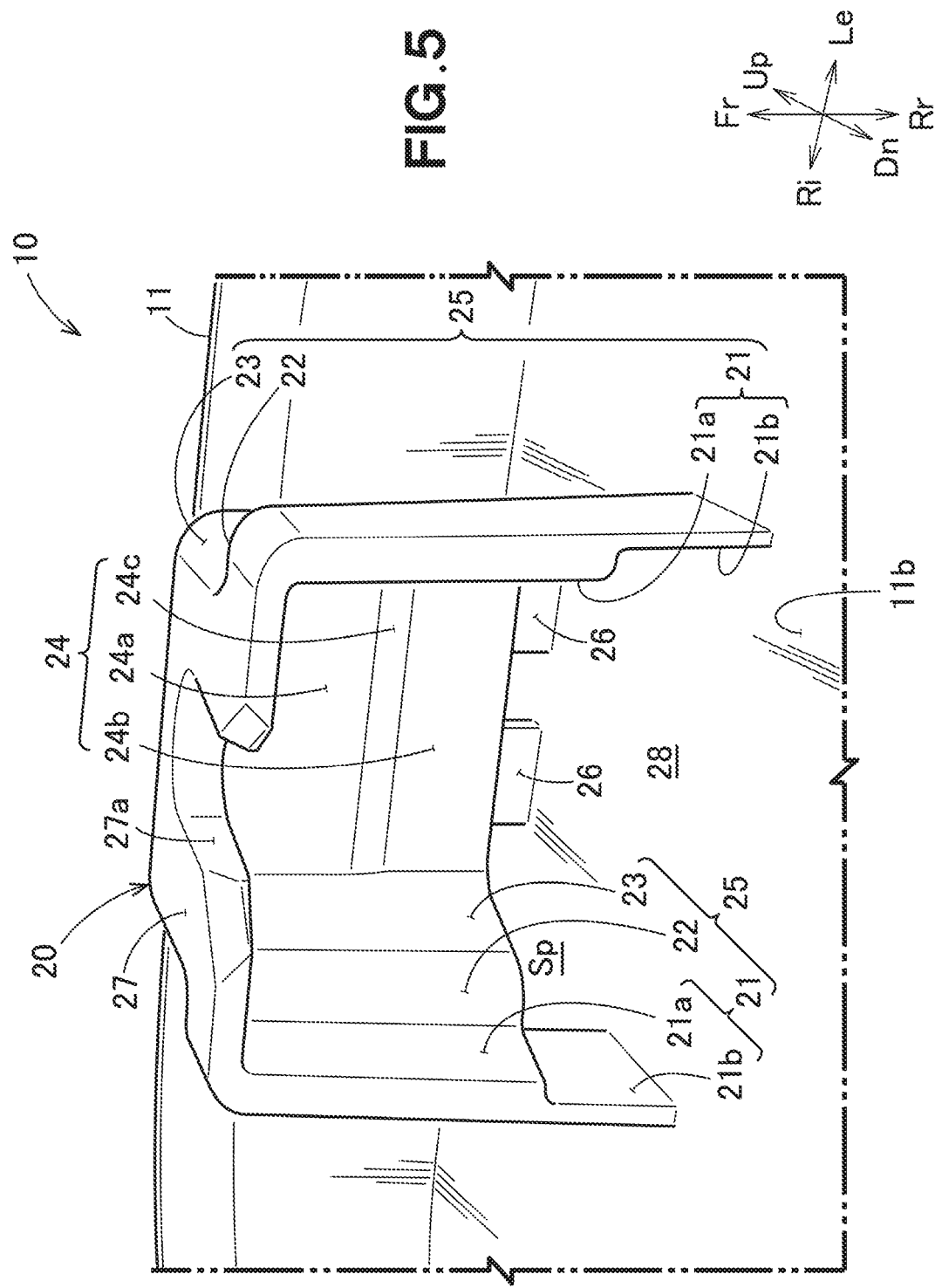
FIG. 5 is a diagram as viewed along an arrow 5 in FIG. 4.

With reference to FIGS. 4 and 5, the mounting member 20 is formed in a box shape that has one surface opened. The mounting member 20 includes two side walls 25 and 25 that face with each other, a connect part 24 that connects respective tips of these side walls 25 and 25, connect-part coupling portions 26 and 26 that connect this connect part 24 to the back surface 11b, a mounting seat-surface 27 which covers the side walls 25 and 25 and the connect part 24, and which is capable of fastening the clip Cl (see FIG. 2), and an the opened part 28 that is an opened space surrounded by the side walls 25 and 25 and the attach seat-surface 27.

With reference to FIGS. 5 and 6, the side walls 25 and 25 include first side-wall parts 21 and 21 that upstand from the back surface 11b at locations adjacent to the opened part 28, steps 22 and 22 that extend toward the opposing sidewalls 25 and 25 from respective ends of these first side-wall parts 21 and 21, and second side-wall parts 23 and 23 the extend in the direction apart from the respective first side-wall parts 21 and 21 from the respective tips of these steps 22 and 22 being as the respective extending start locations.

The two first side-wall parts 21 and 21 face with each other. Note that at least either the side wall 25 includes the first side-wall part 21, the step 22, and the second side-wall part 23. When, for example, the mounting member 20 is formed at an end of the main body 11, no sink mark may occur at all in the design surface. In such a case, the shape of the side wall 25 formed at a portion where no sink mark occurs can be selected as appropriate.

With reference to FIG. 5, the first side-wall parts 21 and 21 each include first side-wall part main bodies 21a and 21a connected to the respective steps 22 and 22, and first side-wall part coupling portions 21b and 21b that connect the lower portions of the respective first side-wall part main bodies 21a and 21a and the back surface 11b. The thicknesses of the first side-wall part coupling portions 21b and 21b are thinner than those of the first side-wall part main bodies 21a and 21a. The external surfaces of the first side-wall part main bodies 21a and 21a and the corresponding external surfaces of the first side-wall part coupling portions 21b and 21b are continuous and leveled on the same plane.

A vertical direction to the thickness direction of the first side-wall part main body 21a is defined as a lengthwise direction. With reference to the lengthwise direction, the first side-wall part coupling portions 21b and 21b are formed at the entire lower portions of the respective first side-wall part main bodies 21a and 21a.

Note that with reference to the lengthwise direction, the first side-wall part coupling portions 21b and 21b may be partially formed at the lower portions of the respective first side-wall part main bodies 21a and 21a. When, in the first side-wall part main bodies 21a and 21a, the respective ends connected to the respective steps 22 are defined as one ends, and the respective ends at the opposite side are defined as other ends, it is desirable that the first side-wall part coupling portions 21b and 21b should be formed at least partially including lower portions of the respective one ends.

With reference to FIG. 6, a length L2 of the first side-wall parts 21 and 21 is less than half of a length L1 of the side wall 25. That is, L1>L2×2. In other words, the length L2 of the first side-wall part 21 is shorter than a length L3 of the second side-wall part 23.

The steps 22 and 22 extend in a direction coming close to each other from respective ends of the first side-wall parts 21 and 21. The steps 22 and 22 are formed so as to be substantially vertical to the respective first side-wall parts 21 and 21, and substantially in parallel with the connect part 24.

The second side-wall parts 23 and 23 are formed so as to be substantially vertical to the respective steps 22 and 22 and the connect part 24. The second side-wall parts 23 and 23 extend in the same direction as the first side-wall parts 21 and 21.

With reference to FIG. 3, the connect part 24 connects the second side-wall parts 23 and 23 formed so as to face with each other. The connect part 24 includes a first connect part 24a which is formed continuously from the attach seat-surface 27 and which extends toward the back surface 11b, a second connect part 24b formed at a location apart from the opened part 28 relative to the first connect part 24a, and a third connect part 24c that connects these first connect part 24a and the second connect part 24b. These first connect part 24a to third connect part 24c extend in different directions, respectively.

Each connect-part coupling portion 26 is formed continuously from the second connect part 24b to the main body 11. The upper surface (external surface) of each connect-part coupling portion 26 is continuing from the upper surface (external surface) of the second connect part 24b. A thickness W1 of each connect-part coupling portion 26 is thinner than a thickness W2 of the connect part 24.

A vertical direction to the thickness direction of the connect part 24 is now defined as the lengthwise direction. Each connect-part coupling portion 26 is formed at a lower portion of the connect part 24 with reference to the lengthwise direction of the connect part 24.

With reference to FIG. 6, the attach seat-surface 27 that includes an attachment-component fitting part 27a which is a notch formed in a generally U-shape toward the upper side and to which the clip Cl (see FIG. 3) is fitted is formed. The clip Cl is slid and fitted in the attachment-component fitting part 27a.

With reference to FIGS. 3 and 5, a hollow space Sp is formed between the step 22, second side-wall part 23, connect part 24 and the back surface 11b. The hollow space Sp is formed between the respective steps 22, respective second side-wall parts 23, respective connect parts 24 and the back surface 11b.

The above-described resin-molded component 10 is manufactured by, for example, injection molding. Molding dies that are applied at the time of molding will be described.

With reference to FIGS. 7 and 8, a resin-molded-component-manufacturing die Mo is applied to manufacture the resin-molded component 10 (see FIG. 2), and a slide-type die 60 is provided so as to be slidable relative to a main die 40.

With reference to FIG. 7, the main die 40 is either a stationary or movable die, and can form a cavity by being joined with another die. When the main die 40 is a movable die, the main die 40 is provided so as to be movable in the back-and-forth direction of the main body 11 (see FIG. 3). The main die 40 has mounting-member corresponding portions 41 which are concaved so as to correspond to the outer circumference of each mounting member 20 (see FIG. 3).

With reference to also FIG. 8, the slide-type die 60 is formed in a generally box shape, and is provided so as to be slidable toward the mounting-member corresponding portion 41. The slide-type die 60 is movable along the vertical direction of the main body 11. That is, the sliding direction of the slide-type die 60 differs from the direction in which the main die 40 that is a movable die moves. By causing the slide-type die 60 to face the mounting-member corresponding portion 41, a space (a cavity) corresponding to the shape of the mounting member 20 is formed between the slide-type die 60 and the mounting-member corresponding portion 41. A melted resin is applied in the formed cavity, and is cooled down, and thus the resin-molded component 10 (see FIG. 2) is manufactured.

With reference to FIG. 8, the slide-type die 60 includes a pair of first side-wall surfaces 61 that form a part of side surfaces, step surfaces 62 that extend in the direction coming close to each other from respective tips of these first side-wall surfaces 61, second side-wall surface 63 that extend in the direction apart from the respective first side-wall surfaces 61 with respective tips of these step surfaces 62 being as a start point, a connection surface 64 that connects respective tips of these second side-wall surfaces 63, an upper surface 67 that covers these first side-wall surfaces 61, step surfaces 62, second side-wall surfaces 63, and connection surface 64, and a protruding section 69 that protrudes from the lower sides of the first side-wall surfaces 61, step surfaces 62, second side-wall surfaces 63, and connection surface 64 to the exterior.

Protruding-section notches 69a and 69a are formed at the tip of the protruding section 69 in a concaved shape.

Also with reference to FIG. 9, in the protruding section 69, a portion located below the first side-wall surfaces 61 is apart from the mounting-member corresponding portion 41, and forms cavities Ca and Ca relative to the mounting-member corresponding portion 41. In the protruding section 69, a portion located below the second side-wall surfaces 63 and the step surfaces 62 is intimately in contact with the mounting-member corresponding portion 41. Hence, no region is filled in this portion. In the protruding section, the portion located below the connection surface 64 is intimately in contact with the mounting-member corresponding portion 41 except the protruding-section notches 69a and 69a. In other words, the protruding-section notches 69a and 69a are apart from the mounting-member corresponding portion 41, and form the mounting-member corresponding portion 41 and also the cavities Ca and Ca.

With reference to FIG. 4 and FIG. 10, by applying a resin in the cavities Ca (see FIG. 9), the first side-wall parts 21 continuous from the main body 11 can be formed. In addition, the connect-part coupling portions 26 which are continuous from the main body 11 and which have a thinner thickness than that of the connect part 24 can be formed.

The resin-molded component 10 as described above accomplishes the following effects.

with reference to FIG. 4, the first side-wall parts 21 upstand from the back surface 11b, and the hollow space Sp is formed between the steps 22, the second side-wall parts 23, the connect part 24, and the main body 11. The first side-wall parts 21 adjacent to the opened part 28 upstand from the back surface 11b. This ensures an attachment rigidity at a portion adjacent to the opened part 28. In contrast, the connect parts 24, the steps 22, and the second side-wall parts 23 have the hollow space Sp formed relative to the main body 11. By decreasing the portion where sink mark is likely to occur, the resin-molded component 10 can be provided which ensures a high quality appearance.

With reference to FIGS. 6 and 10, if the side wall 25 is formed in a planar shape and only a portion near the opened part 28 is formed continuously from the main body 11, in this case, when the slide-type die 60 is slid from a portion that becomes the opened part 28, the die cannot be pulled out at the side wall 25. That is, an undercut portion is to be formed. In order to enable the slide-type die to be pulled out, a plurality of slide-type dies is necessary. According to the embodiment of the present disclosure, the side wall 25 has the step 22. This enables the first side-wall part 21 to continuously upstand from the back surface 11b, and also enables a formation of the hollow space by the single slide-type die in an arbitrary size between the connect parts 24, steps 22, second side-wall parts 23 and the main body 11. Since the resin-molded component can be manufactured by a small number of slide-type dies, the manufacturing costs of the resin-molded component 10 can be reduced.

In addition, as described above, since the step 22 is formed, a formation of an undercut portion is prevented. Adjustment of the slide-type die facilitates adjustment of the length and thickness of the connect-part coupling portion 26. By adjusting the connection-part coupling portion 26 so as to be gradually long or thick, a sufficient attachment rigidity is secured while suppressing a formation of sink mark.

With reference to FIG. 3, the external surface of the connect-part coupling portion 26 is continuous from the external surface of the connect part 24, and the thickness of the connect-part coupling portion 26 is thinner than the thickness of the connect part 24. This enhances the attachment rigidity of the attach member 20, while at the same time, a formation of sink mark is suppressed by thinning. In addition, by forming the external surface of the connect-part coupling portion 26 so as to be leveled on the same plane as the external surface of the connect part 24, the shape of the molding die can be simplified.

The length L2 of the first side-wall part 21 is shorter than the length L3 of the second side-wall part 23. By forming the first side-wall part so as to be shorter than the length of the second side-wall part 23, a portion where sink mark may occur can be decreased, securing the high quality appearance of the resin-molded component 10.

Next, a second embodiment will be described with reference to the figure.

Second Embodiment

FIG. 11 is a perspective view of a mounting member formed on a resin-molded component according to the second embodiment. The illustration by FIG. 11 corresponds to the illustration by FIG. 5.

According to a resin-molded component 10A of the second embodiment, connect-part coupling portions 26A formed on a mounting member 20A are formed along the second side-wall part 23. The other basic structures are common to those of the resin-molded component 10 (see FIG. 5) according to the first embodiment. The common portion to that of the first embodiment will be denoted by the same reference numeral, and the detailed description thereof will be omitted.

Each connect-part coupling portion 26A is formed in a generally triangular shape, and is provided substantially in parallel with the first side-wall parts 21 and with the second side-wall parts 23. In addition, each connect-part coupling portion 26A is provided substantially in parallel with first side-wall part coupling portions 21b. Note that the connect-part coupling portion 26A may be formed in a generally rectangular shape, and the shape is optional.

The resin-molded component 10A that employs the above-described structure according to the second embodiment also accomplishes the advantageous effects of the present disclosure.

Next, a third embodiment will be described with reference to the figure.

Third Embodiment

Figure 12A:
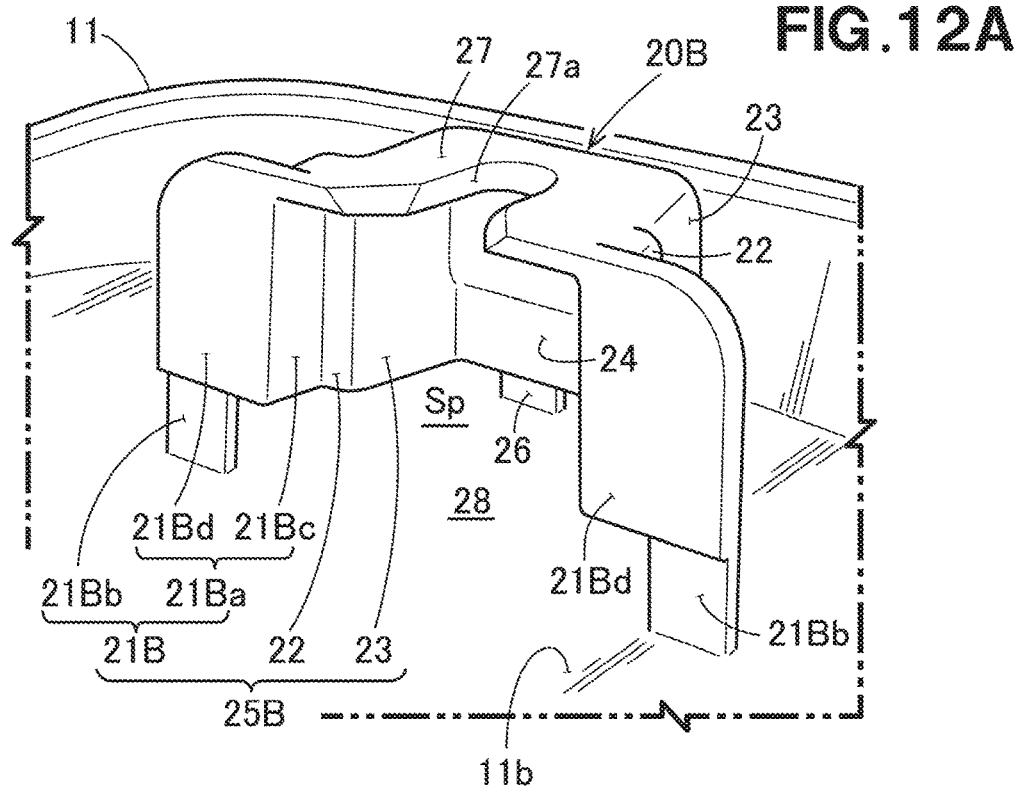
FIG. 12A is a perspective view of a resin-molded component when viewed from the bottom side.
Figure 12B:
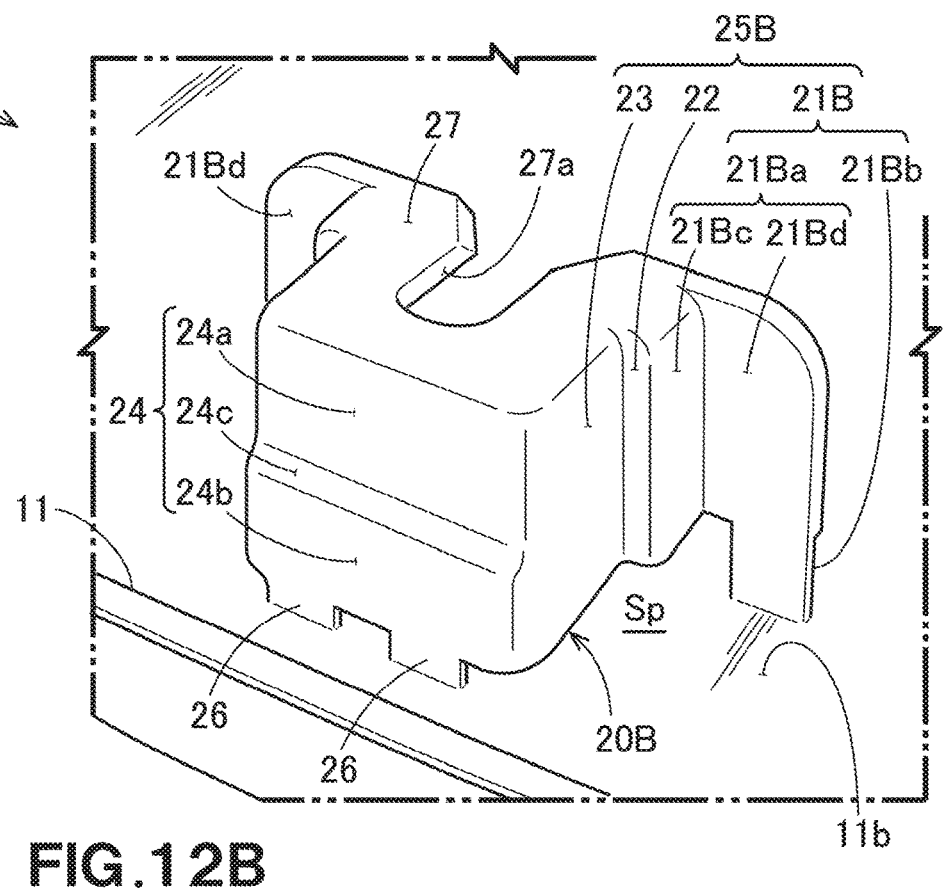
FIG. 12B is a perspective view of the resin-molded component illustrated in FIG. 12A when viewed from the upper side according to a third embodiment.

With reference to FIGS. 12A and 12B, FIG. 12A illustrates an mounting member formed on a resin-molded component according to the third embodiment as viewed from the bottom side. FIG. 12B illustrates the mounting member formed on the resin-molded component according to the third embodiment as viewed from the upper side. The illustration by FIG. 12A corresponds to the illustration by FIG. 5. The illustration by FIG. 12B corresponds to the illustration by FIG. 4.

According to a resin-molded component 10B of the third embodiment, each first side-wall part main body 21Ba that forms the mounting member 20B is formed in a generally L-shape. The other basic structures are common to those of the resin-molded component 10 (see FIG. 5) according to the first embodiment. The common portion to that of the first embodiment will be denoted by the same reference numeral, and the detailed description thereof will be omitted.

Each first side-wall part 21B includes the first side-wall part main body 21Ba formed in a substantially L-shape, and a first side-wall part coupling portion 21Bb that extends from the lower portion of this first side-wall part main body 21Ba to the back surface 11b of the basal member 11.

Each first side-wall part main body 21Ba includes a first main body 21Bc that extends substantially vertically to each step 22, and a second main body 21Bd that extends so as to be apart from the opened part 28 at an end of the first main body 21Bc.

Each first side-wall part coupling portion 21Bb is formed at the lower end of the second main body 21Bd. Conversely, no first side-wall part coupling portion 21Bb is formed at a part of each lower portion of the second main body 21Bd. That is, each first side-wall part coupling portion 21Bb is formed partially at the lower portion of each second main body 21Bd.

In each second main body 21Bd, when an end connected to each first main body 21Bc is defined as a first end, and an end at the opposite side is defined as a second end, it is desirable that each first side-wall part coupling portion 21Bb should be formed partially including at least lower portion of the second end.

In addition, each first side-wall part coupling portion 21Bb is formed substantially in parallel with the connect-part coupling portion 26. The upper surface (the external surface) of each first side-wall part coupling portion 21Bb is continuous from the upper surface (the external surface) of each second main body 21Bd. The thickness of each first side-wall part coupling portion 21Bb is thinner than the thickness of second main body 21Bd.

The resin-molded component 10B that employs the above-described structure according to the third embodiment also accomplishes the advantageous effects of the present disclosure.

Furthermore, the external surface of each first side-wall part coupling portion 21Bb is continuous from the external surface of each first side-wall part main body 21Ba, and the thickness of the first side-wall part coupling portion 21Bb is thinner than the thickness of the first side-wall part main body 21Ba. This enhances the attachment rigidity of the mounting member 20B, while at the same time, a formation of sink mark is suppressed by thinning. In addition, by forming the external surface of each first side-wall part coupling portion 21Bb so as to be leveled on the same plane as the external surface of each first side-wall part main body 21Ba, the shape of the molding die can be simplified.

Next, a fourth embodiment will be described with reference to the figure.

Fourth Embodiment

With reference to FIG. 13, FIG. 13 illustrates a mounting member formed on a resin-molded component according to the fourth embodiment as viewed from the front side. The illustration by FIG. 13 corresponds to the illustration by FIG. 6.

According to a resin-molded component 10C of the fourth embodiment, each second side-wall part coupling portion 26C is formed from the lower portion of each second side-wall part 23 to the back surface 11b. Conversely, no connect-part coupling portion 26 (see FIG. 6) is formed at the lower portion of the connect part 24. The other basic structures are common to those of the resin-molded component 10 (see FIG. 6) according to the first embodiment.

The common portion to that of the first embodiment will be denoted by the same reference numeral, and the detailed description thereof will be omitted.

Each mounting member 20C includes the second side-wall part coupling portions 26C each extended from the lower portion of each second side-wall part 23 to the back surface 11b. Each second side-wall part coupling portion 26C is formed substantially in parallel with each first side-wall part coupling portion 21b. The external surface of each second side-wall part coupling portion 26C is continuous from the external surface of each second side-wall part 23. The thickness of each second side-wall part coupling portion 26C is thinner than the thickness of each second side-wall part 23.

A vertical direction to the thickness direction of the second side-wall part 23 is now defined as the lengthwise direction. Each second side-wall part coupling portion 26C is formed at a part of the lower portion of each second side-wall part 23 with reference to the lengthwise direction of the second side-wall part 23. By aligning the lengthwise direction of the first side-wall part coupling portion 21b with the second side-wall part coupling portion 26C, a reduction of the external appearance is suppressed.

The resin-molded component 10C that employs the above-described structure according to the fourth embodiment can also accomplishes the advantageous effects of the present disclosure.

Furthermore, the external surface of each second side-wall part coupling portion 26C is continuous from the external surface of each second side-wall part 23, and the thickness of the second side-wall part coupling portion 26C is thinner than the thickness of each second side-wall part 23. This enhances the attachment rigidity of the mounting member 20, while at the same time, a formation of sink mark is suppressed by thinning. In addition, by forming the external surface of each second side-wall part coupling portion 26C so as to be leveled on the same plane as the external surface of each second side wall 23, the shape of the molding die can be simplified.

In addition, as described above, since the step 22 is formed, a formation of an undercut portion is prevented. Adjustment of the slide-type die facilitates adjustment of the length and thickness of the second side-wall part coupling portion 26C. By adjusting the second side-wall part coupling portion 26C so as to be gradually long or thick, a sufficient attachment rigidity is secured while suppressing a formation of sink mark.

Next, a fifth embodiment will be described with reference to the figure.

Fifth Embodiment

With reference to FIG. 14, FIG. 14 illustrates a mounting member formed on a resin-molded component according to the fifth embodiment as viewed from the front side.

According to a resin-molded component 10D of the fifth embodiment, a step coupling portion 26D is formed from the lower portion of each step 22 to the back surface 11b. Conversely, no connect-part coupling portion 26 (see FIG. 12) is formed at the lower portion of the connect part 24. The other basic structures are common to those of the resin-molded component 10B (see FIG. 12A) according to the third embodiment. The common portion to that of the third embodiment (also the common portion to that of the first embodiment) will be denoted by the same reference numeral, and the detailed description thereof will be omitted.

A mounting member 20D includes the step coupling portions 26D that extend from the lower portion of the respective steps 22 to the back surface 11b. Each step coupling portion 26D is formed substantially in parallel with each first side-wall part coupling portion 21B. The upper surface (the external surface) of each step coupling portion 26D is continuous from the upper surface (the external surface) of each step 22. The thickness of the step coupling portion 26D is thinner than the thickness of the step 22.

A vertical direction to the thickness direction of the step 22 is now defined as the lengthwise direction. The step coupling portion 26D is formed at a part of the lower portion of the step 22 with reference to the lengthwise direction of the step 22.

The resin-molded component 10D that employs the above structure according to the fifth embodiment also accomplishes the advantageous effects of the present disclosure.

Furthermore, the external surface of each step coupling portion 26D is continuous from the external surface of each step 22, and the thickness of the step coupling portion 26D is thinner than the thickness of the step 22. This enhances the attachment rigidity of the mounting member 20B, while at the same time, a formation of sink mark is suppressed by thinning. In addition, by forming the external surface of each step coupling portion 26D so as to be leveled on the same plane as the external surface of each step 22, the shape of the molding die can be simplified.

In addition, as described above, since the step 22 is formed, a formation of an undercut portion is prevented. Adjustment of the slide-type die facilitates adjustment of the length and thickness of the step coupling portion 26D. By adjusting the step coupling portion 26D so as to be gradually long or thick, a sufficient attachment rigidity is secured while suppressing a formation of sink mark.

Note that although the resin-molded component according to the embodiment of the present disclosure has been described as an example that is the resin component to be attached to a vehicle, the resin-molded component according to the present disclosure is applicable to structural bodies other than a vehicle body, and the present disclosure is not limited to the above-described examples.

Moreover, the respective embodiments can be combined as appropriate. For example, the generally triangular connect-part coupling portion 26A may be applied as a coupling portion that connects the step to the back surface 11b. Moreover, as long as a hollow space is formed, equal to or greater than two kinds of coupling portions among the connect-part coupling portion, the second side-wall part coupling portion, and the step coupling portion may be formed on the single mounting member. Furthermore, when the first side-wall part 21B in a generally L-shape is employed, the first side-wall part coupling portion 21Bb may be also formed on the first main body 21Bc.

Namely, the present disclosure is not limited to the above-described embodiments as long as the actions and advantageous effects of the present disclosure are accomplishable.

INDUSTRIAL APPLICABILITY

The resin-molded component according to the embodiment of the present disclosure is suitable as a component that decorates a vehicle.

What is claimed is:

1. A resin-molded component comprising:
a main body that comprises a design surface which is visible from an exterior; and a mounting member which protrudes from a back surface of the main body and to which an attachment component is attached, wherein the main body and the mounting member are formed integrally with each other, wherein the mounting member is formed in a box shape having one surface opened, and comprises: two side walls facing with each other; a connect part that connects respective tips of the two side walls; a mounting seat-surface which covers the two side walls and the connect part and which is capable of fastening the attachment component; and an opened part surrounded by the two side walls and the attach seat-surface, wherein at least one of the two side walls comprises: a first side-wall part upstanding from the back surface at a location adjacent to the opened part; a step that extends toward the opposing side wall from an end of the first side-wall part; and a second side-wall part that extends in a direction apart from the first side-wall part from a tip of the step, and a hollow space is formed between the connect part, step, second side-wall part and the main body.

2. The resin-molded component according to claim 1, wherein:

the mounting member further comprises a connect-part coupling portion that connects the connect part and the main body;

an external surface of the connect-part coupling portion is continuous from an external surface of the connect part; and a thickness of the connect-part coupling portion is thinner than a thickness of the connect part.

3. The resin-molded component according to claim 1, wherein:

the mounting member further comprising a second side-wall part coupling portion that connects the second side-wall part and the main body;

an external surface of the second side-wall part coupling portion is continuous from an external surface of the second side-wall part; and a thickness of the second side-wall part coupling portion is thinner than a thickness of the second side-wall part.

4. The resin-molded component according to claim 1, wherein:

the mounting member further comprises a step coupling portion that connects the step and the main body;

an external surface of the step coupling portion is continuous from an external surface of the step; and a thickness of the step coupling portion is thinner than a thickness of the step.

5. The resin-molded component according to claim 1, wherein the step is formed substantially in parallel with the connect part.

6. The resin-molded component according to claim 1, wherein a length of the first side-wall part is shorter than a length of the second side-wall part.

* * * * *